US004001631B2

United States Statutory Invention Registration [19]

[11] Reg. Number: H1631

[45] Published: Feb. 4, 1997

Montgomery et al.

[54] METHOD OF FABRICATING RADAR CHAFF

[75] Inventors: John A. Montgomery, Reston; Jack D. Ayers, Oakton; Gregory Cowart, Alexandria, all of Va.

[73] Assignee: United States of America, Washington, D.C.

[21] Appl. No.: 563,086

[22] Filed: Oct. 27, 1995

[51] Int. Cl.[6] ..... H01Q 17/00; H01Q 7/04

[52] U.S. Cl. ..... 342/1; 342/2; 342/3; 427/501; 427/505; 427/160

[58] Field of Search ..... 342/1, 2, 3; 427/501, 427/505, 160

*Primary Examiner*—Peter A. Nelson
*Attorney, Agent, or Firm*—Thomas E. McDonnell; John J. Karasek

[57] ABSTRACT

The present invention is a method for making radar chaff consisting of metal rings having varying diameters, using photolithographic processes. One aspect of the invention has the steps of: providing a metal foil having a thickness suitable for use in radar chaff; overcoating the metal foil with a photoresist, to form a layered structure; undercoating the metal foil with a removable backing; exposing the photoresist to a quantity of actinic radiation for chemically modifying the photoresist into a photoproduct suitable for subsequent development, where the actinic radiation is patterned into a series of concentric rings; developing the photoresist, to expose the underlying metal in a series of concentric rings; removing the exposed metal to form a series of concentric metal rings on the removable backing; and removing the removable backing. Another aspect of the invention is a metal chaff precursor, comprising: a removable backing, coated with a plurality of concentric metal foil rings.

22 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF FABRICATING RADAR CHAFF

BACKGROUND OF THE INVENTION

1. Field of the Invention

The present invention relates to radar chaff, and more particularly to an efficient, low cost method of making radar chaff that completely covers a wide bandwidth. This chaff can be efficiently packed for dispersal by standard dispersal techniques.

2. Description of the Related Art

Radar chaff is generally made from aluminum coated fiberglass which is bundled, cut into lengths, and packed for dispersal. Such chaff absorbs and returns radar most efficiently at frequencies which induce resonant oscillations of electromagnetic waves in the fiber lengths. Because a limited number of different segment lengths are packed into a bundle, the radar response to chaff is maximal at a relatively limited number of frequencies. For example, as shown in FIG. 1, a bundle 10 of aluminum-coated glass fibers 12 may have several smaller bundles 14 of several varying lengths, divided by separators 16, stacked for dispersal.

One possible means for packing a greater variety of lengths of chaff into tubular containers is to use metal rings of varying diameters. Efforts have been made to fabricate metal rings of differing sizes by punching them from metal foil or from thin plastic sheets coated with a metal film, but these attempts have not yielded rings of sufficiently well controlled size to make them useful as chaff. The individual metal rings should preferably have thicknesses near 0.001", and have inner and outer radii differing by about the same amount (i.e., they should have cross sections of about 0.001"×0.001"). However, there is no reliable method for punching concentric rings of such fine cross sections. Also, when rings of larger cross-section have been made, great difficulty has been experienced in efforts to stack the rings in arrays.

SUMMARY OF THE INVENTION

Accordingly, it is an object of this invention to produce radar chaff at low cost.

It is a further object of this invention to produce radar chaff that has an essentially continuous frequency response.

These and additional objects of the invention are accomplished by the structures and processes hereinafter described.

The present invention is a method for making radar chaff consisting of metal rings having varying diameters, using photolithographic processes. One aspect of the invention has the steps of: providing a metal foil having a thickness suitable for use in radar chaff; overcoating the metal foil with a photoresist, to form a layered structure; undercoating the metal foil with a removable backing; exposing the photoresist to a quantity of actinic radiation for chemically modifying the photoresist into a photoproduct suitable for subsequent development, where the actinic radiation is patterned into a series of concentric rings; developing the photoresists, to expose the underlying metal in a series of concentric rings; removing the exposed metal to form a series of concentric metal rings on the removable backing; and removing the removable backing. Another aspect of the invention is a metal chaff precursor, comprising: a removable backing, coated with a plurality of concentric metal foil rings.

BRIEF DESCRIPTION OF THE DRAWINGS

A more complete appreciation of the invention will be obtained readily by reference to the following Detailed Description of the Preferred Embodiments and the accompanying drawings in which like numerals in different figures represent the same structures or elements, wherein.

DETAILED DESCRIPTION OF THE PREFERRED EMBODIMENTS

Figure 1:
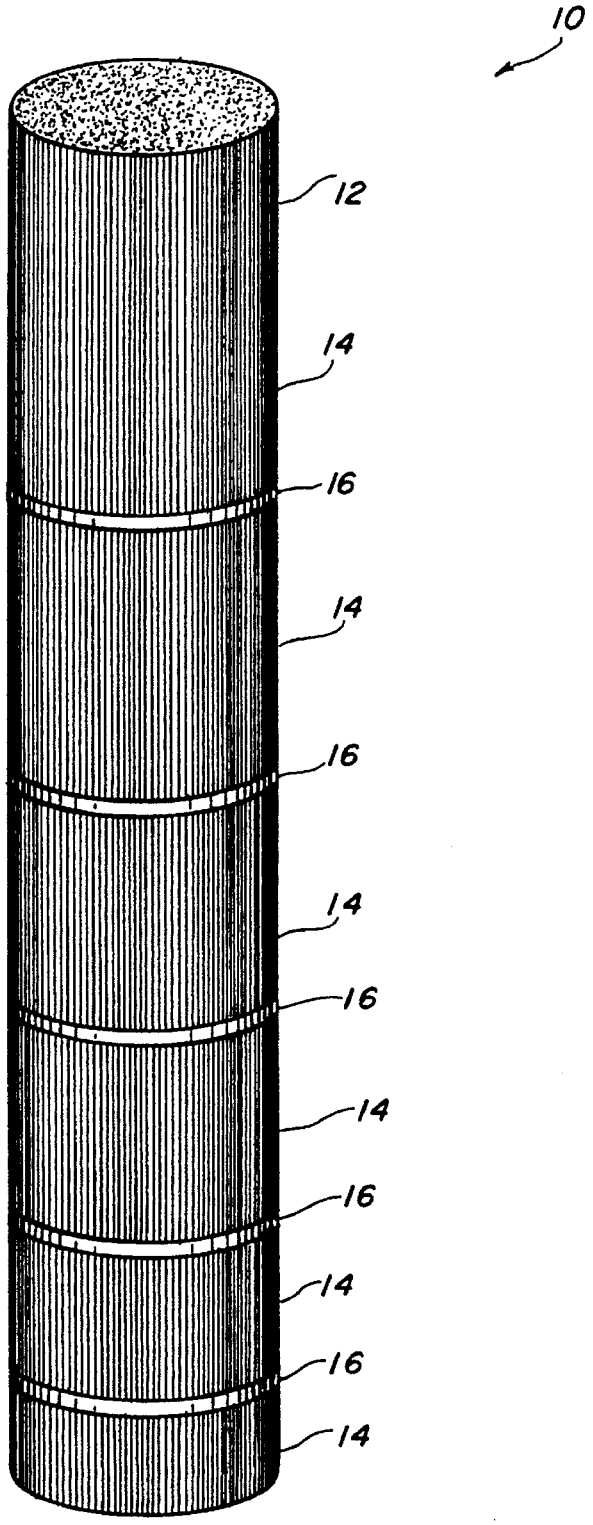
PRIOR ART FIG. 1
FIG. 1 shows bundles of aluminum coated glass fibers used for radar chaff in the prior art.
Figure 2:
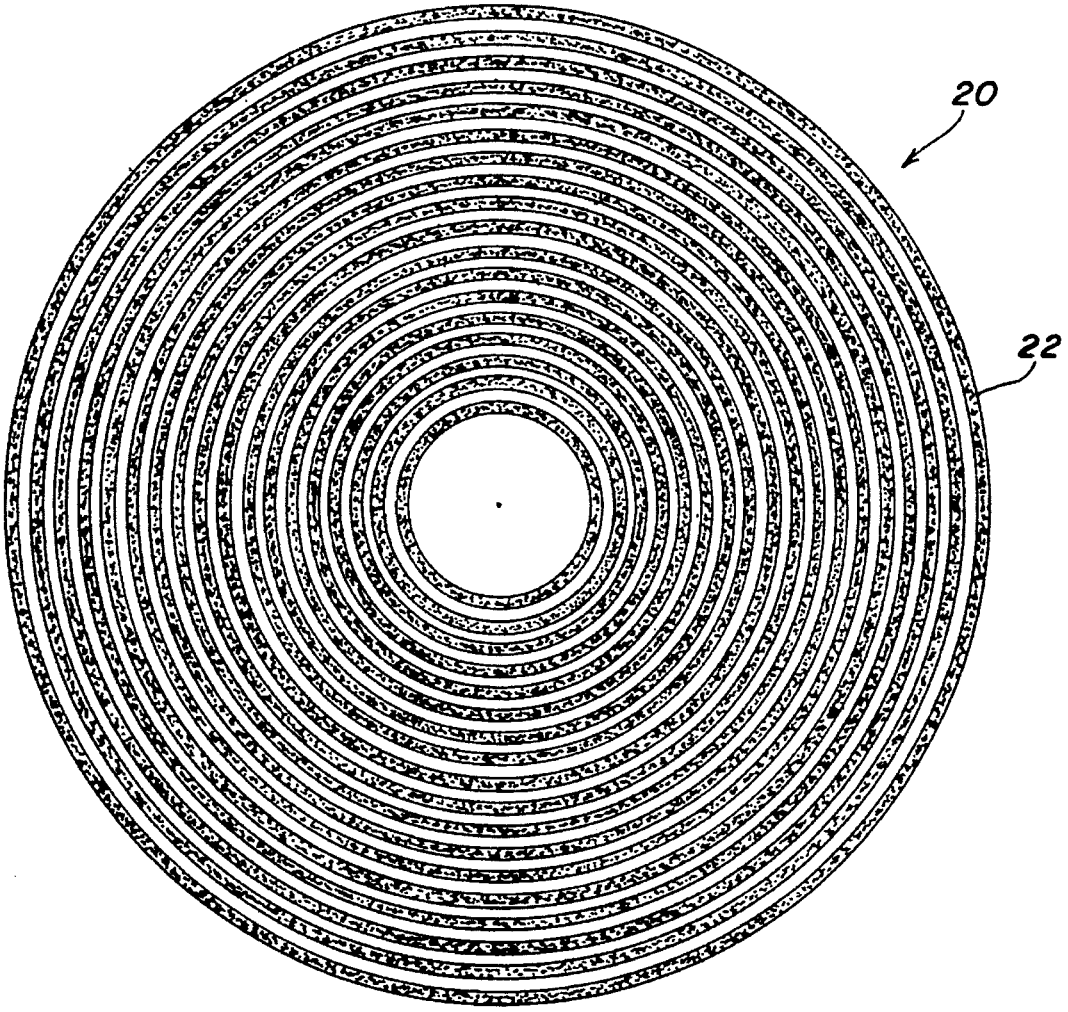
FIG. 2 shows a top view of a plurality of concentric metal rings that may be used as radar chaff.
Figure 3:
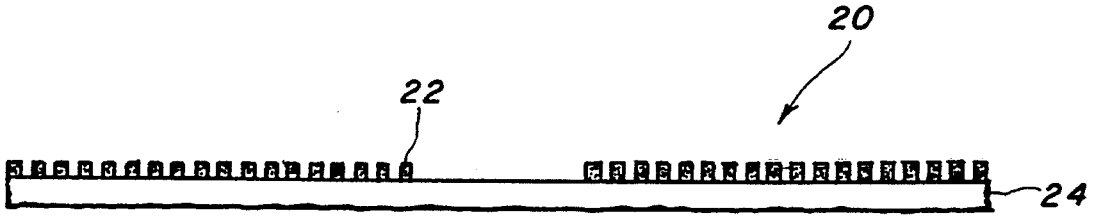
FIG. 3 shows a sectional view of a plurality of concentric metal rings that may be used as radar chaff.

Referring to FIG. 2, a group 20 of metal rings 22 in a concentric arrangement, may be made by a lithographic process according to the invention. When backed by a removable backing 24, as shown in FIG. 3, this structure is a precursor for metal chaff according to the invention.

Radar chaff preferably is made to resonate at a preselected frequency, corresponding to the frequency of some radar (e.g., x-band radar, IJ band electronic warfare applications). For annular chaff, the resonant frequency will be at a wavelength approximately equal to the circumference of the chaff ($\lambda=\pi D$). If a group of metal rings is made so that the rings are sufficiently close in diameter, the frequency response of this chaff will be essentially continuous for wavelengths over the range corresponding to the circumference range of the rings. Typically, at least 100 to 200 different ring diameters will be used in a group of rings used for radar chaff. For example, for a group of rings having widths of about 0.001", and spaces between these rings of about 0.001", where the largest ring has a diameter of about 1.0", and the smallest ring has a diameter of about 0.1", the frequency response of these rings will be essentially continuous over the range from about $\nu$=4 GHz to about $\nu$=40 GHz. This size range may be scaled up or down, depending on the band of radar that this chaff is selected to defeat. Scaling down may be achieved simply by scaling down the lithography used to make the rings. Scaling up may require additionally using a stiffening layer, depending on the stiffness of the metal selected for use in the chaff.

The process of the invention may be practiced in a variety of ways. Possibly the simplest way is to (1) coat a metal foil of an appropriate thickness with a photoresist; (2) expose the photoresist to patterned (typically by using a mask) actinic radiation (typically light) to convert the photoresist to its photoproduct; (3) developing the photoresist pattern with an appropriate developer; (4) undercoating the metal on the surface away from the resist with a lacquer such as an etch-resistant stop-off lacquer; (5) removing the metal exposed by developing, typically by etching; and (6) removing the lacquer, typically by using a lacquer solvent such as acetone. Good results have been achieved with Microshield™ Stop-off lacquer (Pyramid Plastics).

Figure 4:
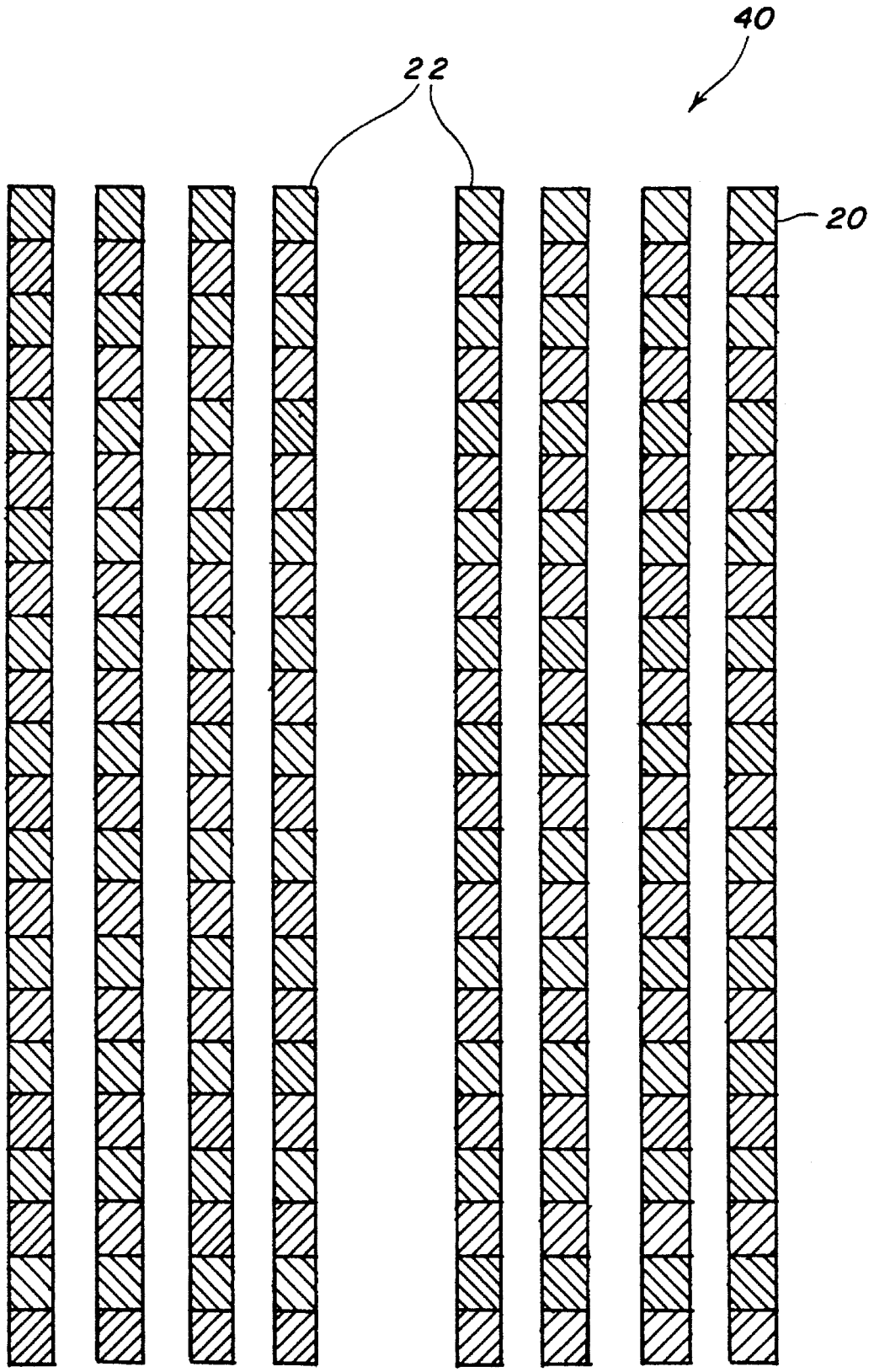
FIG. 4 shows a sectional view of a stack of groups of concentric rings.

If, as shown in FIG. 4, it is desired to stack the groups 20 of concentric rings 22 in a large stack 40, preferably the lacquer is removed after the groups of rings are stacked. Otherwise, it will be difficult to stack a large group of loose rings.

Figure 5:
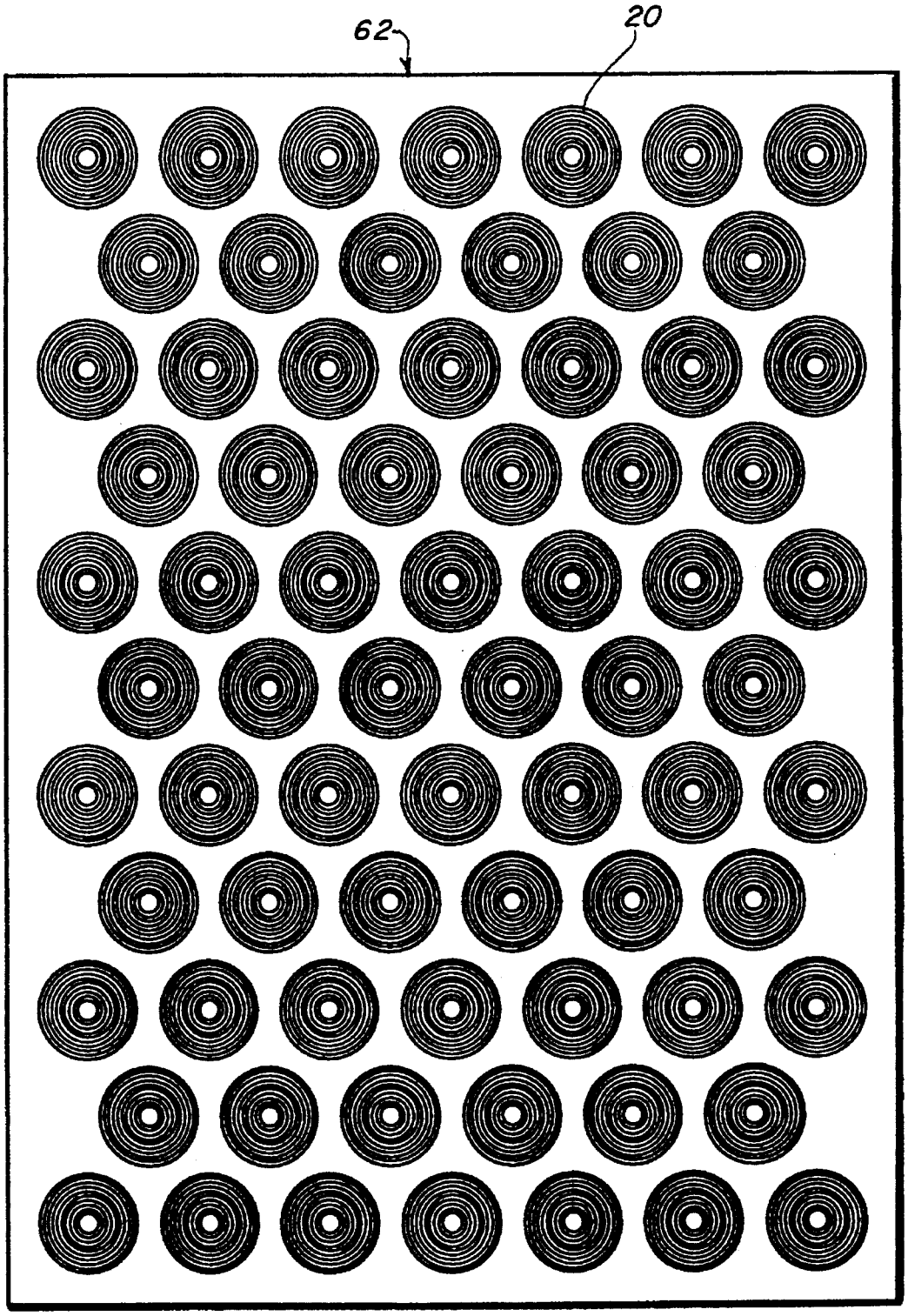
FIG. 5 shows a top view of a sheet having a plurality of groups of concentric metal rings on a common removable backing.

FIG. 5 shows a too view of sheets having a preferred arrangement of groups of concentric metal rings on a common removable backing. A plurality of these sheets may be stacked, providing a preferred way of simultaneously stacking a number of groups of concentric rings.

Figure 6:
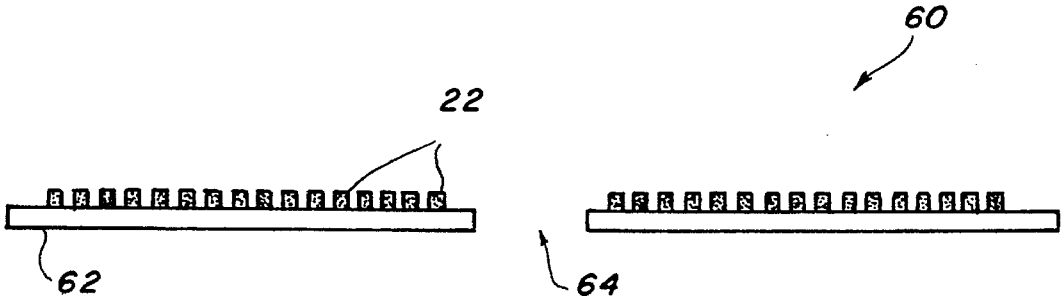
FIG. 6 shows a sectional view of a plurality of concentric metal rings on a removable plastic film backing.

Another method of practicing the invention uses a plastic film instead of a lacquer as the removable backing. As shown in FIG. 6, a group 20 of concentric metal rings 22 may be disposed over a removable plastic film 62. Polyacetyl, which may be removed by exposure to nitric acid fumes, is a preferred removable plastic film. Preferably, this plastic film 62 will have a central channel 64 for improving contact between the removable plastic film and the removing agent. Typically, this channel 64 will be a punched hole.

Figure 7:
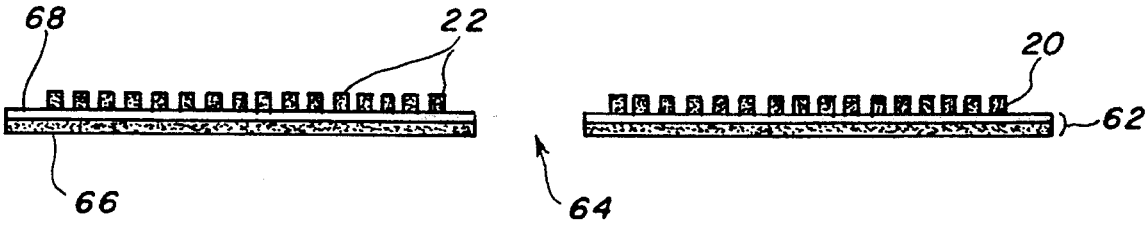
FIG. 7 shows a sectional view of a plurality of concentric metal rings on a removable plastic film backing, where this plastic film includes a substrate plastic layer and a degradable plastic layer.

In another preferred embodiment of the invention, shown in FIG. 7, this plastic film 62 is a bilayer plastic film including a substrate plastic layer 66 and a degradable plastic layer 68. The substrate plastic layer 66 is stable under conditions that will degrade (and thus remove) the degradable plastic layer 68. Preferably, the substrate plastic layer 66 is non-adherent to the metal 22 or to another substrate plastic layer 66. Preferably, the substrate plastic layer 66 is not attacked by an etchant used to remove exposed metal. Preferred substrate plastic layers include teflon and polyethylene.

Thus, a method for practicing the invention using a plastic film as the removable backing has the steps of: coating a plastic film with a metal foil; overcoating the metal foil with a photoresist to form layered structure; exposing the photoresist to a quantity of actinic radiation for chemically modifying the photoresist into a photoproduct suitable for subsequent development, where the actinic radiation is patterned into a series of concentric rings; developing the photoresist, to expose the underlying metal in a series of concentric rings; and removing the exposed metal to form a series of concentric metal rings on the plastic film.

In another preferred embodiment of the invention, prior to the step of overcoating the metal foil with photoresist, the metal foil is overcoated with a ceramic layer. Preferably, the ceramic layer is electrostatically charged, to aid in dispersing the metal rings by electrostatic repulsion. Preferred ceramics include oxides, carbides, nitrides, and borides.

Obviously, many modifications and variations of the present invention are possible in light of the above teachings. It is therefore to be understood that, within the scope of the appended claims, the invention may be practiced otherwise than as specifically described.

What is claimed is:

1. A method for making radar chaff comprising metal rings having varying diameters, comprising the steps of:

providing a metal foil having a thickness suitable for use in radar chaff;

overcoating said metal foil with a photoresist, thereby forming a layered structure;

undercoating said metal foil with a removable backing;

exposing said photoresist to a quantity of actinic radiation for chemically modifying said photoresist into a photoproduct suitable for subsequent development, wherein said actinic radiation is patterned into a series of concentric rings;

developing said photoresist, thereby exposing said underlying metal in a series of concentric rings;

removing said exposed metal to form a series of concentric metal rings on said removable backing; and removing said removable backing.

2. The method of claim 1, wherein said removable backing comprises an etch-resistant lacquer, and said step of removing said removable backing comprises contacting said removable backing with a solvent for said etch-resistant lacquer.

3. The method of claim 1, wherein said step of undercoating said metal foil is conducted after said steps of overrcoating said metal foil with a photoresist, exposing said photoresist, and developing said photoresist.

4. The method of claim 1, wherein said step of undercoating said metal foil is conducted before said step of overrcoating said metal foil with a photoresist.

5. The method of claim 1, wherein said step of undercoating said metal foil with a removable backing comprises coating a removable plastic film onto said metal foil.

6. The method of claim 5, wherein said step of exposing said photoresist to patterned actinic radiation comprises exposing said photoresist to light through a mask patterned with a series of concentric rings.

7. The method of claim 5, wherein said step of removing said metal comprises etching away said metal.

8. The method of claim 5, further comprising the step of:

opening a channel through said layered structure, normal to the plane of said layered structure, at about the center of said concentric rings.

9. The method of claim 5, wherein said plastic film comprises polyacetyl.

10. The method of claim 5, further comprising the step of:

exposing said plastic film to nitric acid fumes after said step of removing said exposed metal, thereby removing said plastic film.

11. The method of claim 5, wherein said plastic film comprises a substrate plastic layer and a degradable plastic layer interposed between said substrate plastic layer and said metal, wherein said substrate plastic layer is stable under conditions that will degrade said degradable plastic layer.

12. The method of claim 11, further comprising the step of:

removing said degradable plastic layer from said metal rings, thereby forming metal chaff.

13. The method of claim 11, wherein said substrate plastic layer is nonadherent to said metal foil or to another substrate plastic layer.

14. The method of claim 11, wherein said substrate plastic layer is selected from the group consisting of teflon and polyethylene.

15. The method of claim 5, further comprising the step of:

prior to said step of overcoating said metal foil with said photoresist, overcoating said metal foil with a ceramic layer.

16. The method of claim 15, wherein said ceramic layer comprises a ceramic selected from the group consisting of oxides, carbides, nitrides, and borides.

17. The method of claim 15, wherein said ceramic layer is electrostatically charged.

18. A method for making radar chaff consisting of metal rings having varying diameters, comprising the steps of:

(a) coating a plastic film with a metal foil;

(b) overcoating said metal foil with a photoresist, thereby forming a layered structure;

(c) exposing the photoresist to a quantity of actinic radiation for chemically modifying said photoresist into a photoproduct suitable for subsequent development, wherein said actinic radiation is patterned into a series of concentric rings;

(d) developing said photoresist, thereby exposing said underlying metal in a series of concentric rings;

(e) removing said exposed metal to form a series of concentric metal rings on said plastic film;

(f) repeating said steps (a) through (e) a plurality of times, thereby forming a plurality of patterned layered structures; and (g) coaxially stacking said plurality of said patterned layered structures.

19. A metal chaff precursor, comprising:

a removable backing, coated with a plurality of concentric metal foil rings.

20. The metal chaff precursor of claim 19, wherein said concentric metal foil rings have circumferences selected to correspond to the wavelengths of selected radars.

21. The metal chaff precursor of claim 19, wherein said concentric metal foil rings have circumferences ranging from about 1.0" to about 0.1".

22. The metal chaff precursor of claim 19, wherein said concentric metal foil rings have cross sections of about 0.001"×0.001".

* * * * *